US007777374B2

(12) United States Patent
Ressel

(10) Patent No.: US 7,777,374 B2
(45) Date of Patent: Aug. 17, 2010

(54) ELECTRICAL APPLIANCE

(75) Inventor: Ekkehard Ressel, Heilsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 470 days.

(21) Appl. No.: 11/575,027

(22) PCT Filed: Aug. 23, 2005

(86) PCT No.: PCT/DE2005/001489

§ 371 (c)(1),
(2), (4) Date: Jan. 25, 2008

(87) PCT Pub. No.: WO2006/026952

PCT Pub. Date: Mar. 16, 2006

(65) Prior Publication Data

US 2008/0238224 A1    Oct. 2, 2008

Related U.S. Application Data

(60) Provisional application No. 60/608,520, filed on Sep. 9, 2004.

(51) Int. Cl.
*H02K 9/18*    (2006.01)
*H02K 9/02*    (2006.01)

(52) U.S. Cl. .............................. 310/59; 310/52; 310/58; 310/64

(58) Field of Classification Search .................. 310/55, 310/58, 59, 64, 254.1
See application file for complete search history.

(56) References Cited

U.S. PATENT DOCUMENTS 4,348,604 A * 9/1982 Thode ......................... 310/62

4,845,394 A * 7/1989 Kleinhans .................... 310/64

(Continued)

FOREIGN PATENT DOCUMENTS

JP      57 040344 A      8/1980

(Continued)

*Primary Examiner*—Burton Mullins
(74) *Attorney, Agent, or Firm*—Henry M. Feiereisen; Ursula B. Day

(57) ABSTRACT

The invention relates to an electric appliance (1) which comprises a machine module (2) provided with an electric machine (3) comprising a stator (4) and a rotor. A machine housing (7) of the machine module (2) receives the electric machine (3). A cooling module (19) comprises a cooling housing (21), which is fluidically connected to the machine housing (7) by means of a first cooling fluid connection area (20) in a housing wall (17) of the machine housing (7) and to at least one second cooling fluid connection area (23) in the housing wall (17) of the machine housing (7). The inside of the machine housing (7) can be fluidically connected to the inside of the cooling housing (21) in one section of the housing wall (17), which is oriented towards the cooling housing (21), by means of at least one third cooling fluid connection area (25) comprising at least one cooling fluid through-opening (26). Various cooling module variants can use said third cooling fluid connection area (25) when other cooling module variants, which can be used in exchange with the cooling module (19) in the machine module (2), do not use the third cooling fluid connection area (25). As a result, an electric appliance (1), a machine module (2) therefore and a set comprising a plurality of different cooling modules, which can meet altered cooling requirements having reduced structural and constructional costs, can be produced.

12 Claims, 7 Drawing Sheets

U.S. PATENT DOCUMENTS

| | | | |
|---|---|---|---|
| 5,783,892 A * | 7/1998 | Kanzaki et al. | 310/432 |
| 5,883,448 A * | 3/1999 | Zimmerman | 310/52 |
| 6,239,522 B1 * | 5/2001 | Glahn et al. | 310/63 |
| 6,246,134 B1 * | 6/2001 | Berrong et al. | 310/52 |
| 6,262,501 B1 * | 7/2001 | Semba et al. | 310/52 |
| 6,392,320 B1 * | 5/2002 | Glahn et al. | 310/52 |
| 6,724,107 B1 * | 4/2004 | Ide et al. | 310/55 |
| 6,750,573 B1 * | 6/2004 | Friedman et al. | 310/59 |
| 2004/0222711 A1 * | 11/2004 | Klimt | 310/59 |

FOREIGN PATENT DOCUMENTS

| | | |
|---|---|---|
| JP | 60 219939 | 4/1984 |
| JP | 61 285039 A | 6/1985 |
| RU | 2 089 033 C1 | 8/1997 |
| RU | 37 281 U1 | 4/2004 |
| SU | 14 03 247 A1 | 6/1988 |
| WO | WO 01/17094 A1 | 3/2001 |

* cited by examiner

ELECTRICAL APPLIANCE

BACKGROUND OF THE INVENTION

An electrical appliance having a machine module and a cooler module, a machine module for an electrical appliance such as this, as well as a set comprising a plurality of cooler modules for assembly with a machine module such as this.

The invention relates to an electrical appliance. The invention also relates to a machine module for an electrical appliance and to a set comprising a plurality of cooler modules for assembly with a machine module.

An electrical appliance of the type mentioned initially is known from JP 60-219 939 A. There, the electrical appliance has a heat exchanger through which a flow passes along a zigzag path, starting from the first cooling fluid connection zone, to the second cooling fluid connection zone. The cooling of known electrical appliances such as these is in each case matched to the machine module that is used. As soon as it is found that a specific cooling technique is no longer adequate for the machine module, the cooling for the electrical appliance must be completely redesigned.

One object of the present invention is therefore to refine an electrical appliance of the type mentioned initially in such a manner that it is possible to satisfy changing cooling requirements with less construction and design effort.

According to the invention, this object is achieved by an electrical appliance having a) a machine module which includes an electrical machine with a stator and a rotor, a machine housing, which holds the electrical machine, and b) a cooler module, including a cooler housing which is connected for fluid flow purposes via a first cooling fluid connection zone in a housing wall of the machine housing, and at least one second cooling fluid connection zone in the housing wall of the machine housing to the interior of the machine housing, wherein the interior of the machine housing can be connected for fluid flow purposes, in a section of the housing wall which faces the cooler housing, via at least one third cooling fluid connection zone by means of at least one cooling fluid aperture opening to the interior of the cooler housing.

According to the invention, it has been found that different variants of the cooling air guidance in the machine housing can be provided by the specific configuration of the machine housing of the machine module with three cooling fluid connection zones. These different cooling air guidance variants can then be combined with appropriate cooler modules, so that it is possible to take account of individual cooling requirements. The electrical appliance according to the invention can thus be equipped with different cooling techniques for the respective cooler module, without any need to make any physical changes for this purpose to the machine module, in particular without having to make any physical changes to the machine housing. By way of example, the following cooling techniques can be implemented with the same machine housing, just by adaptation of the cooler module: open air cooling from both ends of the electrical machine, closed air cooling with an air-air heat exchanger from both ends of the electrical machine, closed air cooling with an air-water heat exchanger from both ends of the electrical machine, open air cooling flowing longitudinally through the electrical machine, closed air cooling flowing longitudinally through the electrical machine with an air-air heat exchanger, closed air cooling flowing longitudinally through the electrical machine with an air-water heat exchanger. The cooler module either has only the function of cooling fluid guidance or includes active cooling elements such as heat exchangers. A standardized machine housing can be used for all of these cooling techniques. An electric motor, or alternatively a generator, may be used as the electrical machine.

SUMMARY OF THE INVENTION

According to another feature of the present invention, a machine housing can hold the electrical machine in such a manner that an axial cooling fluid flow is produced between a stator casing and the housing wall. This provides effective stator cooling.

According to another feature of the present invention, a machine housing can hold the electrical machine in such a manner that a cooling fluid flow which surrounds the stator casing is provided between the stator casing and the housing wall. This allows cooling fluid guidance in which cooling fluid is not only supplied to or carried away from the ends of the machine, but is also passed via a central section of the machine housing. The cooling fluid can be supplied to this central section of the machine housing via the circulating and tangential cooling fluid flow component. This allows on the one hand cooling from both ends, and as well as cooling which flows through the machine from one end, on the other hand to be provided with one and the same machine housing.

According to another feature of the present invention, the housing wall can have webs which run internally parallel to the stator axis, on which webs the stator casing rests at least in places, and which webs release aperture openings for circulating cooling fluid flow when the stator is fitted. Webs offer a simple design capability to ensure a circulating cooling fluid flow.

According to another feature of the present invention, through openings, called hereinafter aperture openings, can be provided in the webs to result in defined tangential cooling fluid guidance.

According to another feature of the present invention, air can be used as the cooling fluid. This represents the simplest variant for cooling within the machine housing. Alternatively, it is also possible to use a different cooling fluid, in particular a cooling gas other than air. In principle, it is also possible to use a cooling liquid.

According to another feature of the present invention, at least one axial or radial fan can be provided in the cooler housing and/or in the machine housing in order to preset an air flow direction. This is advantageous when the rotor movement itself does not preset or does not adequately preset the desired flow direction of the cooling fluid.

A further object of the invention is to provide a machine module which can be connected to cooler modules which use different cooling techniques without any additional complexity. According to the invention, this object is achieved by a machine module as set forth above.

The advantages of this machine module correspond to those which have already been described above with reference to the electrical appliance according to the invention.

A further object of the invention is to provide a choice of cooling variants matched to the particular application, for a machine module, without having to make any design changes to the machine module for this purpose.

According to the invention, this object is achieved by a set comprising a plurality of cooler modules, for assembly with a machine module with a machine housing as set forth above, and with at least two cooler modules, comprising the following cooler module variants:

A first cooler module variant has a first cooler housing area which is connected for fluid flow purposes via at least one inlet opening to the surrounding area, and is connected for fluid flow purposes via corresponding aperture openings to the first and to the second cooling fluid connection zone, and a second cooler housing area which is separated in a fluid-tight manner from the first cooler housing area, and is connected for fluid flow purposes via at least one aperture opening to the third cooling fluid connection zone, and is connected for fluid flow purposes via an outlet opening to the surrounding area.

A second cooler module variant has a first cooler housing section which is connected for fluid flow purposes via corresponding aperture openings to the first and to the second cooling fluid connection zone, a second cooler housing section which is connected for fluid flow purposes to the first cooler housing section and is connected for fluid flow purposes via at least one aperture opening to the third cooling fluid connection zone, and a heat exchanger, which makes thermal contact with the two cooler housing sections.

A third cooler module variant has a first cooler housing area which is connected for fluid flow purposes via at least one inlet opening to the surrounding area, and is connected for fluid flow purposes via at least one aperture opening to the first cooling fluid connection zone, a second cooling housing area which is separated in a fluid-tight manner from the first cooling housing area and is connected for fluid flow purposes via at least one aperture opening to the second cooling fluid connection zone, and is connected for fluid flow purposes via at least one outlet opening to the surrounding area, a sealing device which seals the third cooling fluid connection zone such that no cooling fluid is exchanged between the machine module and the cooler module.

A fourth cooler module variant has a first cooler housing area which is connected for fluid flow purposes via at least one aperture opening to the first cooling fluid connection zone, a second cooler housing section which is connected for fluid flow purposes to the first cooler housing section and is connected for fluid flow purposes via at least one aperture opening to the second cooling fluid connection zone, a heat exchanger which makes thermal contact with the two cooler housing sections, a sealing device, which seals the third cooling fluid connection zone such that no cooling fluid is exchanged between the machine module and the cooler module through the third cooling fluid connection zone.

The first cooler module variant allows open air cooling from both ends of the electrical machine. The second cooler module variant allows closed air cooling with a heat exchanger from both ends of the electrical machine. The third cooler module variant allows open air cooling flowing longitudinally through the electrical machine. The fourth cooler module variant allows closed air cooling flowing longitudinally through the electrical machine, with a heat exchanger. Depending on the ingress protection class of the electrical machine, it is then possible, for example to choose an open or closed type of cooling. A closed electrical machine can be operated with an air-air heat exchanger or with an air-water heat exchanger. The maximum cooling power based on VDE 0530 and thus the maximum machine power are achieved with an open machine with forced-draft ventilation and with air-water cooling. With a correspondingly reduced power, an air-air cooled machine offers the advantage of a closed type in combination with air cooling. Electrical machines are manufactured with different numbers of poles and are therefore designed for different rotation speeds. These machines can then the operated with a power supply system with a fixed rotation speed or from a converter with a variable rotation speed. Depending on the number of pole pairs and when converters are used for operation, it may also be advantageous, depending on the desired rotation-speed range, to cool the machine with the air flow from both ends, or from one end. In this case, the air resistance of the cooler module also plays an important role. Depending on the cooling type and number of pole pairs and the rotation speed it is possible according to the invention to choose the most efficient cooling variant with one and the same machine housing. Cooler modules with cooling air guides which do not require the third cooling fluid connection zone for the machine housing, seal them simply with the respective sealing device, so that the cooling air flows solely through the two remaining cooling fluid connection zones to the machine housing.

According to another feature of the present invention, at least one cooler module of the second and fourth cooler module variant can in each case be provided, with the cooler housing of the fourth cooler module variant being identical to the cooler housing of the second cooler module variant, apart from the additional sealing device. This refinement of cooler module variants is particularly advantageous for cost-effective production of these cooler module variants. Alternatively it is possible to provide a tube connection in order to supply cooling air to the machine housing. When air is supplied at one end, that is to say it flows longitudinally through the electrical machine, the third cooling fluid connection zone is closed with the aid of the sealing device. In the case of air cooling from both ends, the air is supplied via tube connections to the first and second cooling fluid connection zone, and the air is carried away via the tube connection to the third cooling fluid connection zone.

According to another feature of the present invention, the heat exchanger for the second or fourth cooler module variant can be a gas-gas heat exchanger, in particular an air-air heat exchanger. The heat exchanger for the second or fourth cooler module variant can also be a gas-liquid heat exchanger, in particular an air-water heat exchanger. Heat exchangers are adequate for many cooling requirements, even relatively demanding cooling requirements.

BRIEF DESCRIPTION OF THE DRAWING

Exemplary embodiments of the invention will be explained in more detail in the following text with reference to the drawing, in which.

DETAILED DESCRIPTION OF PREFERRED EMBODIMENTS

Figure 1:
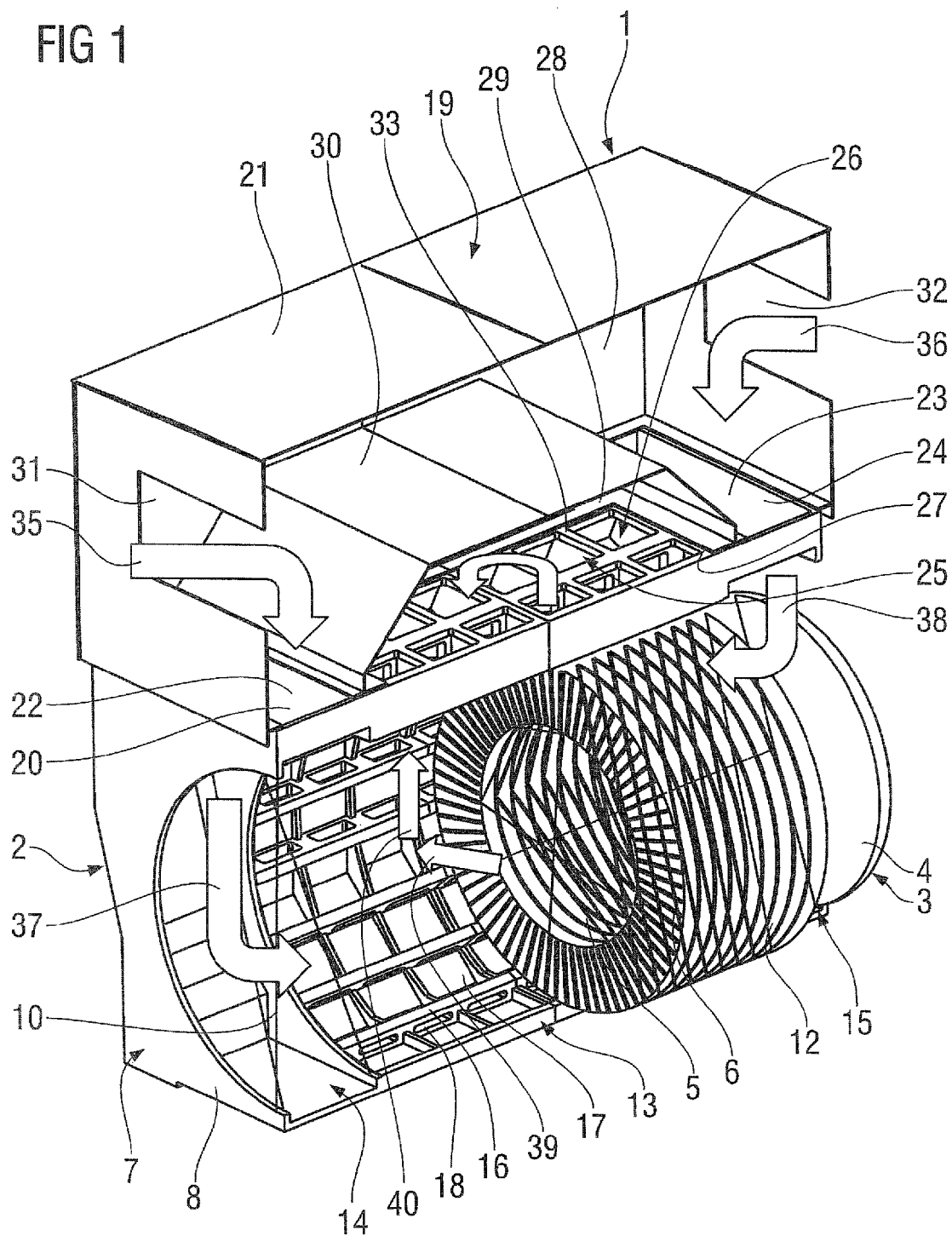
FIG. 1 shows a perspective view of a detail of an electrical appliance having a machine module and a first cooler module variant, which represents part of a set comprising a plurality of cooler modules for assembly with the machine module.

FIG. 1 shows a perspective view of a detail of a drive appliance 1 as an example of an electrical appliance. This is a machine with a cooling circuit. The electrical appliance 1 has a motor module 2 illustrated at the bottom of FIG. 1, as an example of a machine module. This has an electric motor 3 as an example of an electrical machine of which only a stator 4 to be precise the right-hand cutaway half of it, is illustrated in FIG. 1. The stator 4 is in the form of a laminated core. As is known per se, the stator 4 has a plurality of aperture openings 5 through which fluid can flow radially through the stator 4. The rotor, which is not illustrated, also has corresponding aperture openings, which are known per se. Furthermore both the stator 4 and the rotor have passages 6 which run both through the stator 4 and through the rotor in the axial direction and through which fluid can likewise flow.

Figure 7:
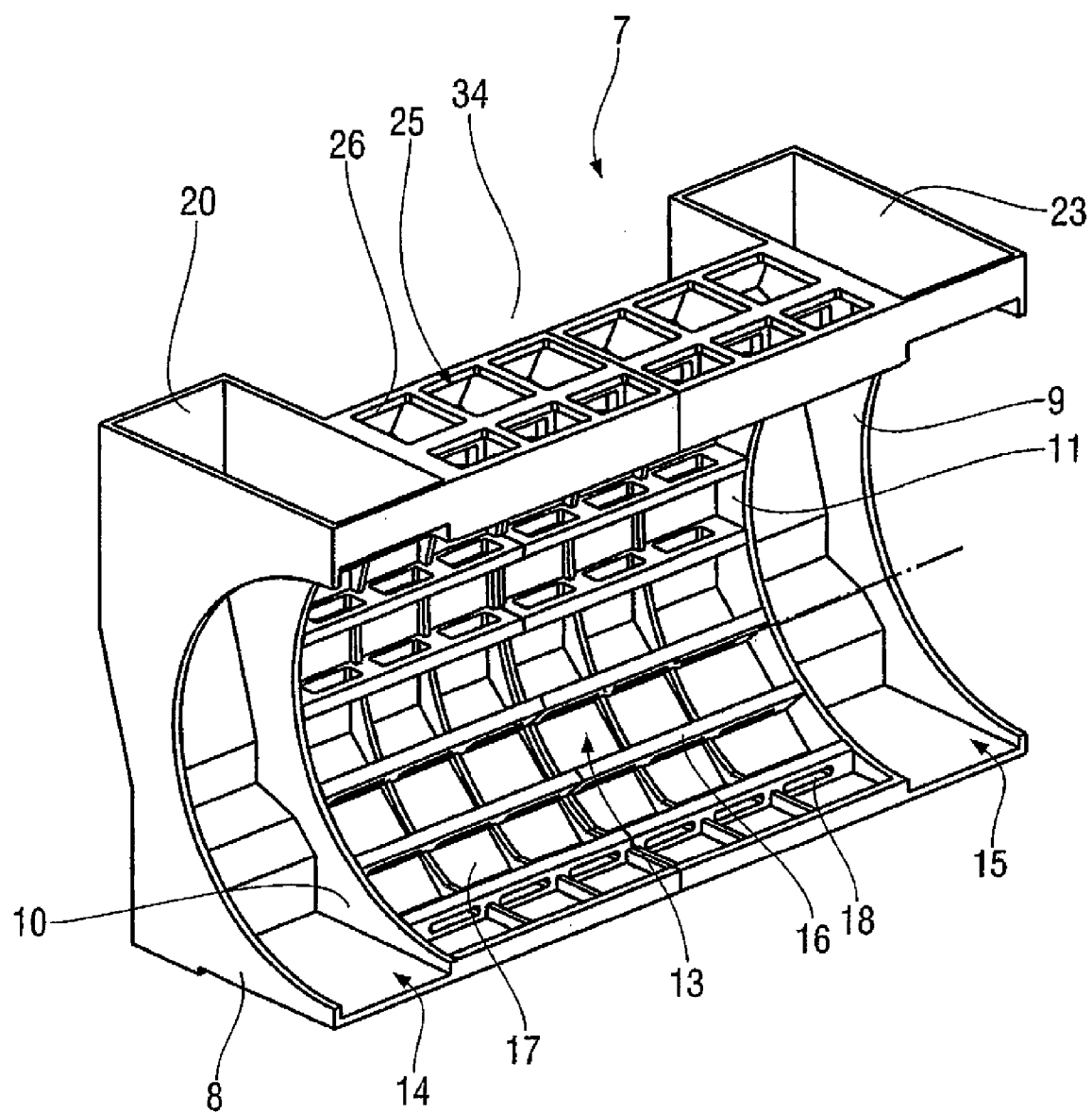
FIG. 7 shows a perspective, enlarged view, of a detail of a machine housing for the machine module.

The electric motor 3 is accommodated in a machine or motor housing 7. The drawing shows only a vertically longitudinally sectioned rear half of this housing. The machine housing 7 has a first end wall 8, on the left in the drawing, and a second end wall 9 on the right in the drawing. Adjacent to the first end wall 8 and at a distance from it, the machine housing 7 has a first intermediate wall 10, in the left in the drawing. Adjacent to the second end wall 9, the machine housing 7 has a second intermediate wall 11, on the right in FIG. 7. When the electric motor is assembled, an end shield which is not illustrated, in each case seals the electric motor 3 from the end walls 8, 9, such that it is not possible for any fluid to flow into or out of the machine housing 7 at the end, that is to say at the two ends of the electric motor 3. When the electric motor 3 is assembled, a casing wall 12 of the stator 4 also rests on the intermediate walls 10, 11. The stator casing is sealed on the housing walls via guide walls, which are not illustrated. When the electric motor 3 is assembled, the machine housing 7 is thus subdivided into an axial central section 13 between the two intermediate walls 10, 11 into a first edge section 14 which is shown on the left in the drawing between the first end wall 8 and the first intermediate wall 10, and into a second edge section 15 which is shown on the right in FIG. 7 between the second intermediate wall 11 and the second end wall 9.

In the area of the central section 13, the machine housing 7 has an octagonal cross section at right angles to its longitudinal axis. In the central section 13, the casing wall 12 of the stator 4 rests on the machine housing 7 via webs 16 which run axially between the intermediate walls 10, 11 and are firmly connected to a housing casing wall 17 of the machine housing 7. The external circumference of the stator 4 is fixed to the webs 16. The webs 16 have fluid aperture openings 18 at right angles to their extent direction and parallel to the adjacent section of the housing wall 17. In the illustrated exemplary embodiment, six aperture openings 18 are provided for each web 16.

In FIG. 1, a cooler module 19 of the electrical appliance 1 is arranged above the machine housing 7 and is firmly connected to the machine module 2. The interior of a cooler housing 21 of the cooler module 19 is connected for fluid flow purposes to the first edge section 14 of the machine housing 7 via a first cooling fluid connection zone 20 in an upper section in the drawing, of the housing wall 17 which faces the cooler module 19 and is formed at the cooler end by a cooling fluid supply opening. For this purpose, the cooler housing 21 has an aperture opening 22 in the bottom face in FIG. 1, which is aligned with the first cooling fluid connection zone 20 of the machine housing 7. Furthermore, the machine housing 7 has a second cooling connection zone 23, which is likewise formed on the motor side by a cooling fluid aperture opening in that housing wall section of the machine housing 7 which faces the cooler module 19. The second edge section 15 of the machine housing 7 is connected for fluid flow purposes to the cooler housing 21 via the second cooling fluid connection zone 23. For this purpose, the cooler housing 21 has a further aperture opening 24, on the bottom face on the right in FIG. 1. Furthermore, the machine housing 7 has a third cooling fluid connection zone 25 in the housing wall section which faces the cooler module 19. This is located between the first two cooling fluid connection zones 20, 23. The third cooling fluid connection zone is formed on the motor side in the upper wall section in the drawing, that is to say the wall section facing the cooler housing 21, of the central section 13 which has an octagonal cross section, of the machine housing 7 and is subdivided into a plurality, in the illustrated exemplary embodiment into a total of 18, square aperture openings 26 arranged in a grid.

The central section 13 is connected for fluid flow purposes to the interior of the cooler housing 21 via the third cooling fluid connection zone 25. For this purpose, on the bottom face, the cooler housing 21 has a central aperture opening 27 between the aperture openings 22 and 24.

The interior of the cooler housing 21 is subdivided into a first cooler housing area 28, that is to say the upper cooling housing area in FIG. 1 and into a second cooler housing area 29 which is illustrated centrally at the bottom in FIG. 1. The two cooling housing areas 28, 29 are separated from one another in a fluid-tight manner by a partition wall 30 in the form of a platform. The latter extends from a bottom intermediate web of the cooler housing 21 which is arranged between the aperture openings 22 and 27, to a further bottom intermediate web of the cooler housing 21 between the aperture openings 27 and 24. The first cooler housing area 28 is connected for fluid flow purposes on the one hand by the aperture openings 22 and 24 to the first cooling fluid connection zone 20, and on the other hand to the second cooling fluid connection zone 23. The second cooler housing area 29 is connected for fluid flow purposes via the aperture opening 27 to the third cooling fluid connection zone 25. The first cooler housing area 28 is connected for fluid flow purposes to the area surrounding the cooler module 19 via inlet openings 31, 32 which are arranged opposite one another at the ends. The second cooler housing area 29 is connected to the area surrounding the cooler module 19 via a bottom outlet opening 33. The outlet opening 33 is aligned with a cutout 34 in the housing section of the machine housing 7 facing the cooler module 19, with this resulting from the octagonal cross section of the central section 13.

Open air cooling of the electric motor 3 at both ends in the electrical appliance 1, as shown in FIG. 1, operates as follows:

Air is sucked in via the inlet openings 31, 32 into the first cooler housing area 28 of the cooler housing 21, as indicated by the flow direction arrows 35, 36 in FIG. 1. A suction effect which results in this inward suction, is created by the rotation of the rotor on the electric motor 3 in the stator 4. The air that is sucked in passes through the first cooling fluid connection zone 20 and the second cooling fluid connection zone 23, that is to say on the one hand it enters the first edge section 14 of the machine housing 7 via the aperture openings 22 and 20, and on the other hand enters the second edge section 15 of the machine housing 7 via the aperture openings 24 and 23. As indicated by the direction of the flow arrows 37, 38, the cooling air enters the central section 13 of the machine housing 7 from there. In this case, the air flows from both ends of the electric motor 3 through the corresponding aperture openings and passages in the rotor and through the aperture openings 5 and the passages 6 in the stator 4. This therefore represents double-ended cooling of the electric motor 3. Furthermore, for example, the cooling air which emerges from the stator 4 passes over the outside of the casing wall 12 of the stator 4. The casing wall 12 is separated from the housing wall 17 by the webs 16, so that fluid can flow between the casing wall 12 and the housing wall 17. This provides efficient air-cooling for the rotor and the stator 4. In the central section 13, the cooling air can flow through the aperture openings 18 in the webs 16 to the aperture openings 26 in the third cooling fluid connection zone 25, as indicated by the flow direction arrows 39, 40. The aperture openings 18 in the webs 16 therefore allow for circulating and tangential cooling air flow between the casing wall 12 and the housing wall 17. The cooling air which transports the waste heat away enters the second cooling housing area 29 from the third cooling fluid connection zone 25 and flows out to the exterior again from the outlet opening 33, from this area, via the cutout 34.

Figure 2:
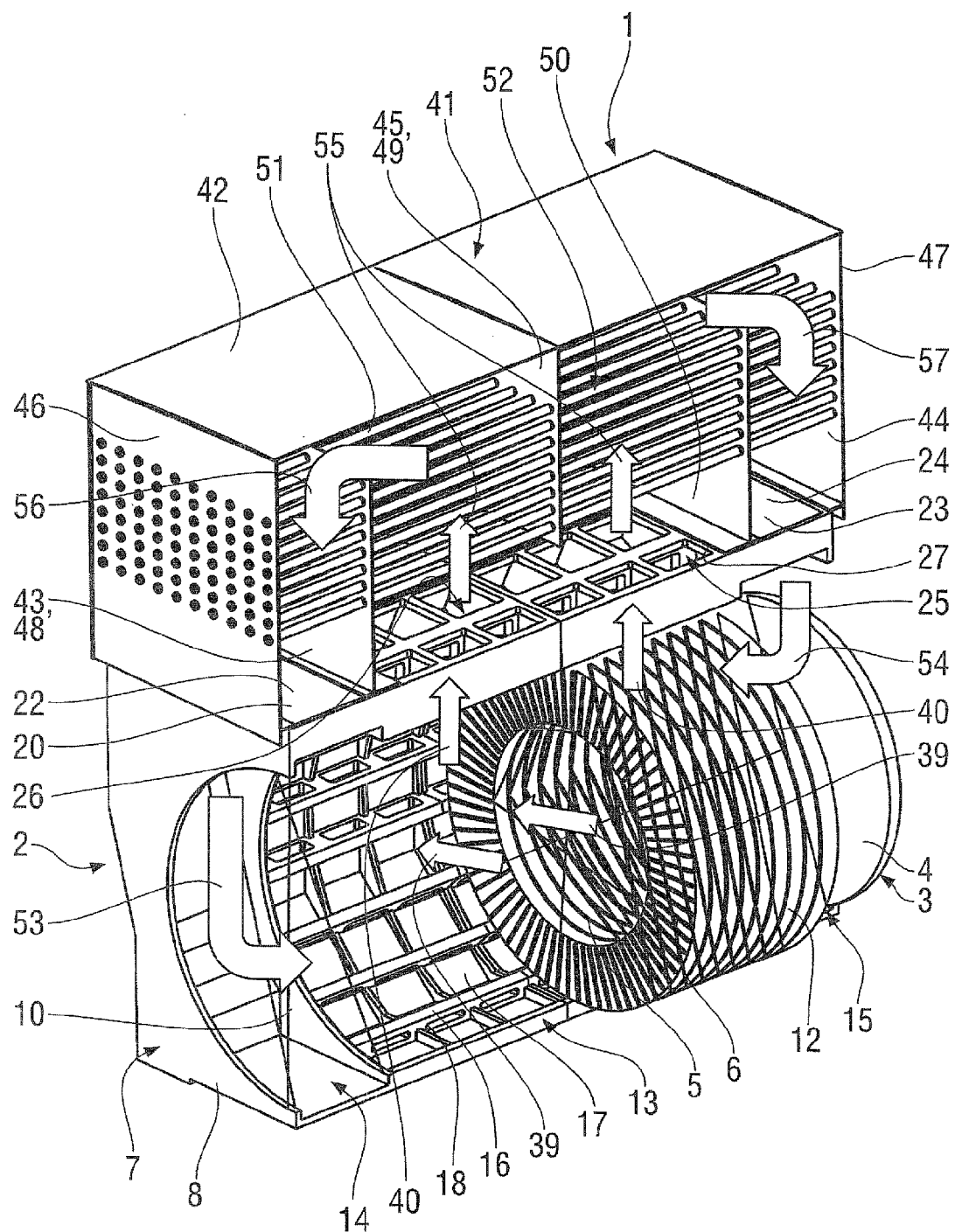
FIG. 2 shows a perspective view of a detail of a further electrical appliance having the machine module as shown in FIG. 1 and of a second cooler module variant of the cooler module set, which has an air-air heat exchanger.

FIG. 2 shows the machine module 2 with a second variant of a cooler module 41. The latter will be described in the following text only where it differs from the cooler module 19. Components which correspond to those which have already been explained above with reference to FIG. 1 have the same reference numbers and will not be discussed in detail again.

A cooler housing 42 of the cooler module 41 is subdivided into a first cooler housing section with two edge sections 43, 44 on the one hand, and the second cooler housing section 45 on the other hand. The edge sections 43, 44 of the cooler housing 42 are arranged above the edge sections 14, 15 of the machine housing 7 in FIG. 2. The edge section 43 is connected for fluid flow purposes via the aperture opening 22 to the aperture opening in the first cooling fluid connection zone 20 in the machine housing 7. The edge section 44 is connected for fluid flow purposes via the aperture opening 24 to the aperture opening in the second cooling fluid connection zone 23 of the machine housing 7. The second cooler housing section 45 is connected for fluid flow purposes via the aperture opening 27 to the aperture openings 26 in the third cooling fluid connection zone 25 of the machine housing 7.

Three supporting walls 48, 49, 50 are arranged parallel to end walls 46, 47 of the cooler housing 42, which are shown on the left and right in FIG. 2 in the interior of the cooler housing 42. The first supporting wall 48, which is shown on the left in FIG. 2, is mounted at the bottom on a supporting web of the cooler housing 42, which is arranged between the aperture openings 22 and 27. The supporting wall 48 separates the edge section 43, on the left in FIG. 2, from the second cooler housing section 45. This separation is not complete, since the supporting wall 48 does not extend as far as the housing wall of the cooler housing 42 shown at the top in FIG. 2. The second supporting wall 49 is mounted on the wall of the cooler housing 42 shown at the top in FIG. 2, in the second cooler housing section 45. The second supporting wall 49 does not extend as far as the bottom of the cooler housing 42, so that the supporting wall 49 in the second cooler housing section 45 does not represent a barrier for cooling fluid. The third supporting wall 50 is mounted on a bottom supporting web of the cooler housing 42 which is arranged between the aperture openings 27 and 24, and its extend corresponds to that of the first supporting wall 48. Like the first supporting wall 48, the third supporting wall 50 represents a subdivision, which can be overcome for cooling fluid between the second cooler housing section 45 and the edge section 44 on the right in FIG. 2.

Cooling air tubes 51 for secondary cooling air are supported by the end walls 46, 47 and the supporting walls 48 to 50 and passed through the cooler housing 42 parallel to the axis of the electric motor 3. In the exemplary embodiment shown in FIG. 2 there are a total of eighty cooling air tubes 51. These form an air-air heat exchanger 52.

Closed air-circuit cooling is provided at both ends for the electrical appliance 1 shown in FIG. 2 as follows:

Primary cooling air enters the machine housing 7 via the first cooling fluid connection zone 20 and the second cooling fluid connection zone 23, as indicated by flow direction arrows 53, 54 in FIG. 2. The further cooling air flow in the machine housing 7 in the electrical appliance 1 as shown in FIG. 2 corresponds to the cooling air flow for the cooling of the electrical appliance 1 shown in FIG. 1 as indicated by the flow direction arrows 39, 40. After passing through the third cooling fluid connection zone 25, the cooling air which transports the heat away enters the second cooler housing section 45 of the cooler housing 42, as indicated by flow direction arrows 55. In the second cooler housing section 45 and in the two edge sections 43, 44 of the first cooler housing section of the cooler housing 42, heat is now exchanged from the heat-emitting primary cooling air to the heat-receiving secondary cooling air which flows through cooling air tubes 51. The primary cooling air in this case bypasses the separating walls 48, 50 and once again flows in the direction of the first cooling fluid connection zone 20 on the one hand, and the second cooling fluid connection zone 23 on the other hand, as indicated by flow direction arrows 56, 57. This completes the cooling circuit of the primary cooling air. The flow direction of this cooling circuit results from the suction effect of the electric motor 3.

Figure 3:
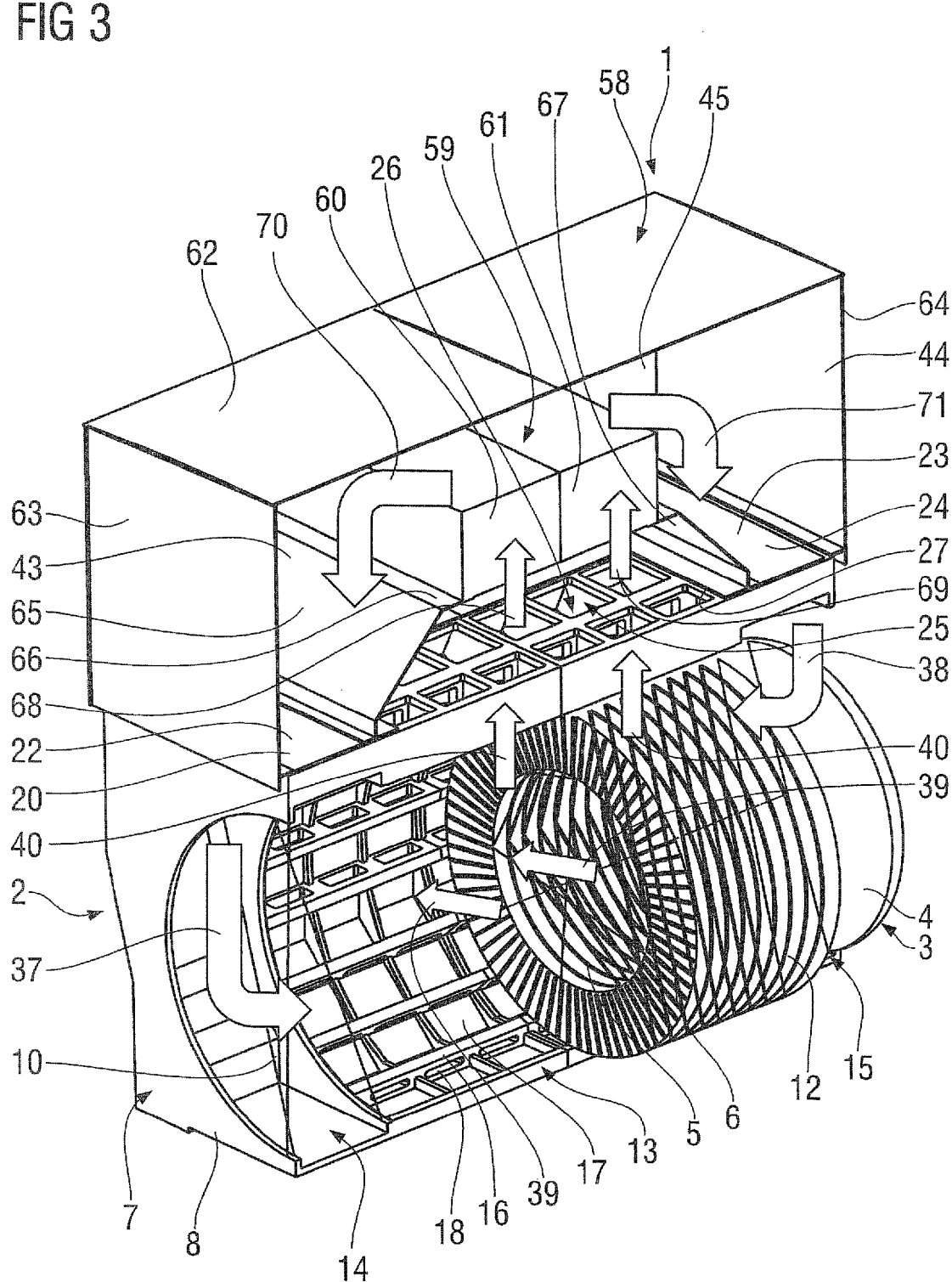
FIGS. 3-6 show perspective views of a detail of the machine module as shown in FIG. 1, with further cooler module variants.

A further variant of a cooler module 58 will be described in the following text with reference to FIG. 3. The description covers only the differences between the cooler module 58 and the cooler module 41 shown in FIG. 2. Components which correspond to those which have already been explained above with reference to FIGS. 1 and 2 have the same reference numbers and will not be discussed in detail again.

Instead of an air-air heat exchanger, the cooler module 58 has an air-water heat exchanger 59. This has two laminate modules 60, 61, which are illustrated schematically in FIG. 3 as blocks with a rectangular cross section. As is known, for example, from motor vehicle radiators, the cooling laminates of the laminate modules 60, 61 through which cooling water flows are in the form of flat structures, which are all aligned essentially parallel to the main extent plane. This main extent plane is at the same time at right angles to the bottom of a cooler housing 62 of the cooler module 58, and on the other hand is at right angles to end walls 63, 64 of the cooler housing 62 with these being shown on the left and right in FIG. 3. This alignment of the laminate results in the flows of the primary cooling air being impeded as little as possible. The water heat exchanger 59 is supported by a supporting wall 65 in the form of a platform. A contact wall 66 of the supporting wall 55 on which the water heat exchanger 59 rests is designed such that air can pass through it, that is to say it has aperture openings for the primary cooling air.

These aperture openings distinguish the supporting wall 65 from the separating wall 30 in the cooler housing 21 of the cooler module 19 shown in FIG. 1. Otherwise, the form and the installation of the supporting wall 65 correspond to those for the separating wall 30. The supporting wall 65 separates a first cooler housing section of the cooler housing 62 with the edge sections 43, 44 from the second, central cooler housing section 67, which is bounded at the top by the supporting wall 65 in FIG. 3.

Closed air-water cooling at both ends for the cooler module variant shown in FIG. 3 operates as follows:

The primary cooling air flow in the machine housing 7 corresponds to that which has been described in conjunction with the cooler module 41 shown in FIG. 2. The heated cooling air enters the second cooler housing section 67 of the cooler housing 62 from the third cooling fluid connection zone 25, from where it enters the laminate modules 60, 61 through the contact wall 66 as indicated by flow direction arrows 68, 69. In the laminate modules 60, 61, the cooling air emits its heat to the cooling water of the water heat exchanger 59 as it flows through the laminates. From the laminate modules 60, 61 the cooling air that has been cooled down flows into the edge sections 43, 44 of the cooler housing 62 from where it once again flows in the direction of the aperture openings 22, 24 as indicated by flow direction arrows 70, 71.

A third variant of a cooler module 72 will be described in the following text with reference to FIG. 4 in which case this third variant can be mounted on the machine module 2 in order to complete an electrical appliance 1 instead of the cooler modules 19, 41 and 58. Components of the cooler module 72 which correspond to those which have already been explained above in conjunction with FIGS. 1 to 3 have the same reference numbers and will not be discussed in detail again. A cooler housing 73 of the cooler module 72 is subdivided into a first, bottom cooler housing area 74 and a second, cooler housing area 75, which is essentially arranged above it. The two cooler housing areas 74, 75 are separated from one another in a fluid-tight manner via a separating wall 76 within the cooler housing 73.

The first cooler housing area 74 is connected for fluid flow purposes to the area surrounding the cooler module 72 via an inlet opening 77. The size and arrangement of the inlet arrangement 77 correspond to those of the outlet opening 33 of the cooler module 19 shown in FIG. 1. The first cooler housing area 74 is connected for fluid flow purposes to the second cooling fluid connection zone 23 via the aperture opening 24.

Figure 4:
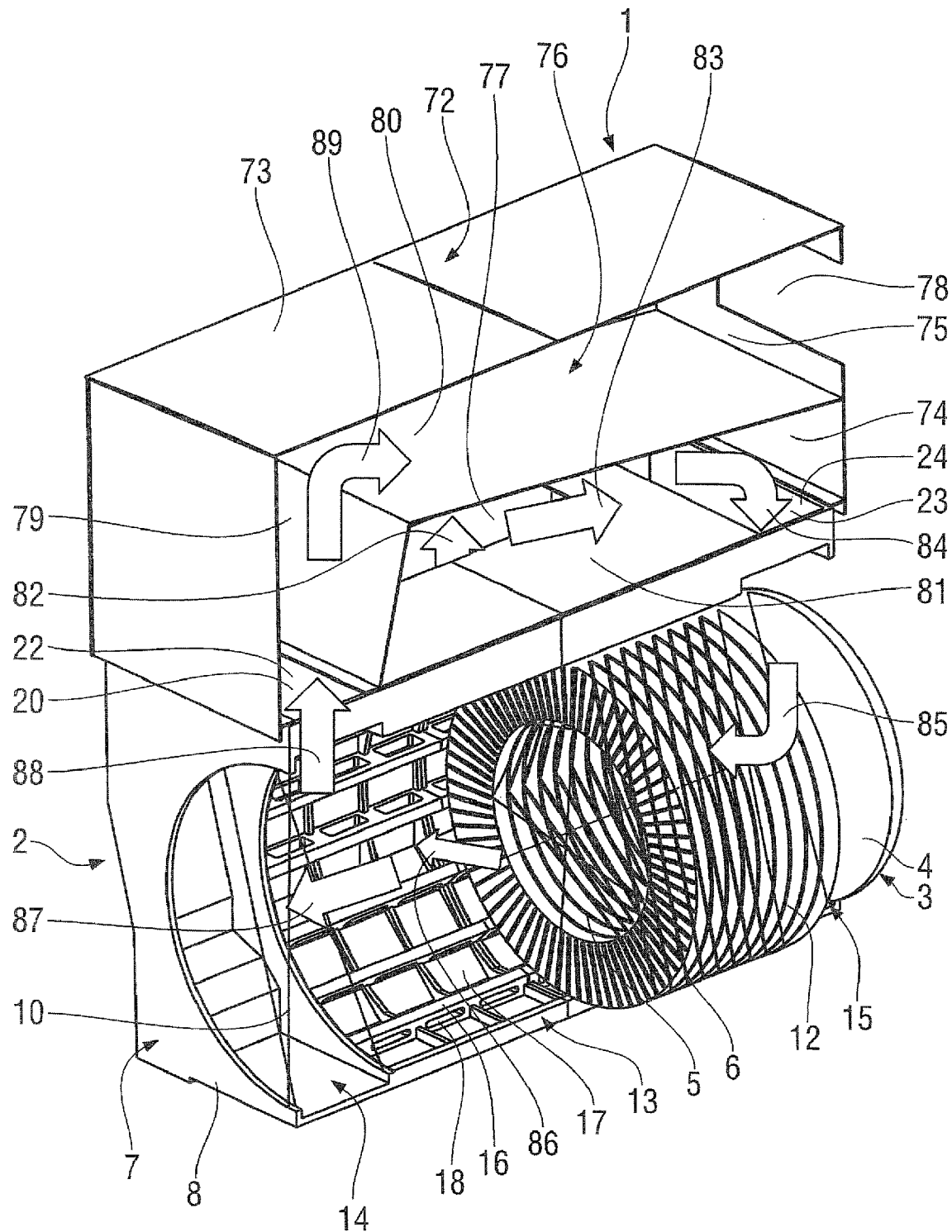

A section of the second cooler housing area 75 on the left in FIG. 4 is connected for fluid flow purposes to the first cooling fluid connection zone 20 of the machine housing 7 via the aperture opening 22. The second cooler housing area 75 is connected to the area surrounding the cooler module 72 via an outlet opening 78. The size and arrangement of the outlet opening 78 correspond to those of the inlet opening 32 of the cooler housing 21 shown in FIG. 1.

The separating wall 76 has a first separating wall section 79, which is mounted on a bottom supporting web of the cooler housing 73 between the aperture opening 22 and the inlet opening 77, and rises steeply from the bottom, so that the second cooler housing area 75 initially widens continuously, starting from the aperture opening 22. A second separating wall section 80 of the separating wall 76 is adjacent to the first separating wall section 79. This is arranged such that it falls away slightly in the cooler housing 73 so that the second cooler housing area 75 widens continuously towards the outlet opening 78, starting from the connection between the two separating wall sections 79, 80.

Apart from the bottom openings 22, 24 and 77, the bottom of the cooler housing 73 is in the form of a plate through which no fluid can pass. In particular, a sealing plate 81 is arranged above the third cooling fluid connection zone 25 of the machine housing 7. The latter represents a sealing device which seals the third cooling fluid connection zone 25 in such a manner that no fluid can be exchanged between the machine module 2 and the cooler module 72 through this cooling fluid connection zone 25.

Open air cooling of the electrical appliance 1 at one end with the cooler module 72 operates as follows:

Cooling air is sucked into the first cooler housing area 74 from the outside via the inlet opening 77. The suction effect is once again produced by rotation of the rotor in the stator 4. Alternatively, this suction effect can be produced or assisted by a fan. No such fan is illustrated in FIG. 4 but, for example this may be in the form of a radial fan arranged in the first edge section 14 of the machine housing 7. Alternatively, an axial fan can also be provided. A flow direction arrow 82 indicates the entry of the cooling air into the inlet opening 77. From the inlet opening 77, the cooling air initially flows through the first cooler housing area 74 as indicated by a flow direction arrow 83, and from there through the aperture opening 24 and the second cooling fluid connection zone 23 into the second edge section 15 of the machine housing 7, as indicated by a flow direction arrow 84. In FIG. 4, the cooling air then flows from the right into the electric motor 3, and flows through the aperture openings and passages in the rotor on the one hand as well as the aperture openings 5 and the passages 6 in the stator 4 on the other hand, as described in conjunction with the cooling air flow for cooling in FIG. 1. Since the cooling air cannot escape upward through the third cooling fluid connection zone 25, the cooling air flows completely through the electric motor 3 axially from right to left in FIG. 4 as indicated by flow direction arrows 85, 86 and 87. This thus represents cooling of the electric motor 3 from one end. From the central section 13, the cooling air then flows into the first edge section 14 of the machine housing 7, and from there via the first cooling fluid connection zone 20 and the aperture opening 22 into the second cooler housing area 75 of the cooler housing 73, as indicated by a flow direction arrow 88. The heated cooling air then flows from the aperture opening 22 through the continuously widening second cooler housing area 75 to the junction between the separating wall sections 79, 80 as indicated by a flow direction arrow 89, to the outlet opening 78, and from there out of the cooler housing 73.

Figure 5:
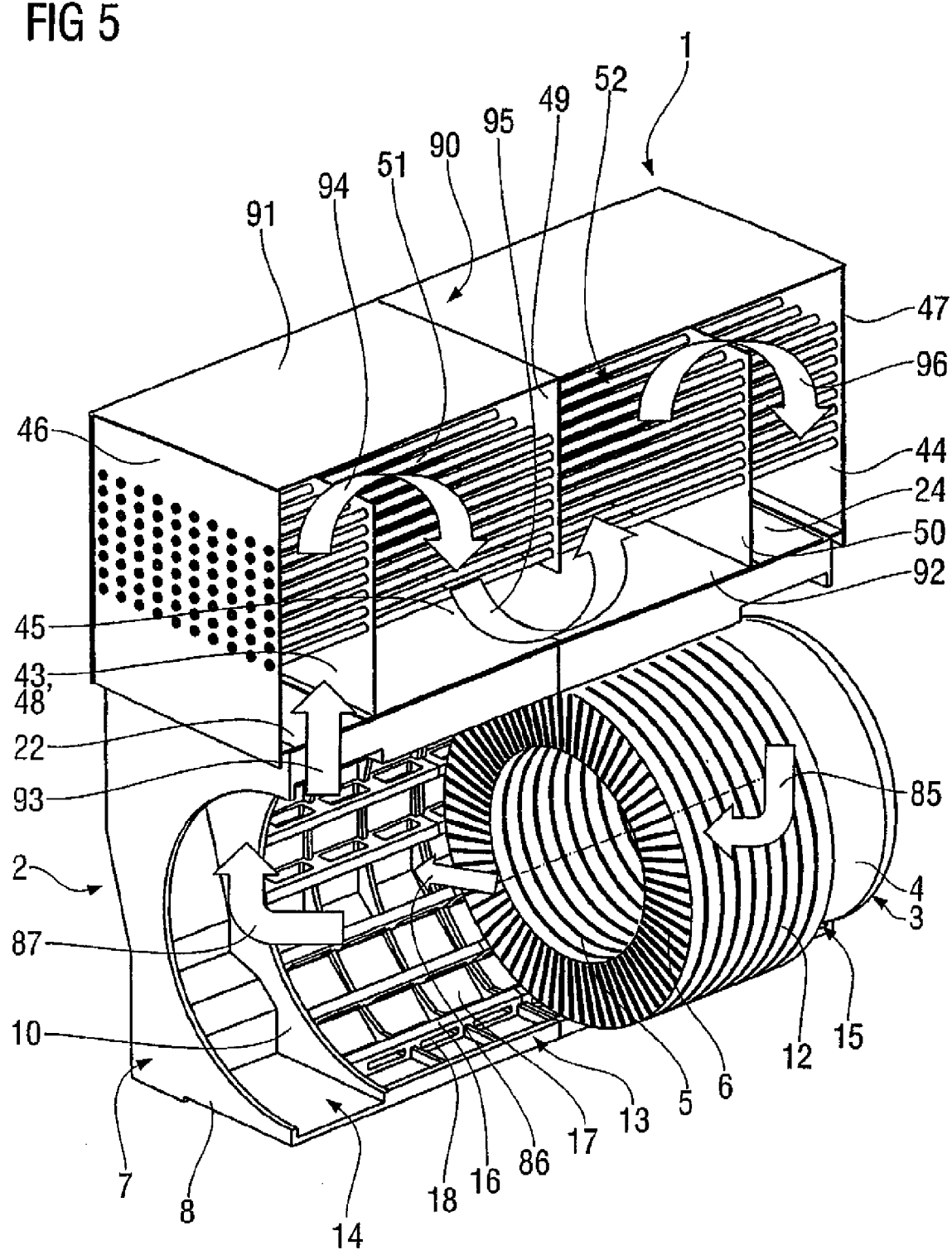

FIG. 5 shows the electrical appliance 1 of a fourth variant of a cooler module 90, which can be mounted on the machine module 2. The design of the cooler module 90 will be described in the following text only where it differs from the design of the cooler module 41 shown in FIG. 2. Components which correspond to those which have already been explained with reference to FIGS. 1 to 4, have the same reference numbers and will not be discussed in detail again. A cooler housing 91 of the cooler module 90 does not have the aperture opening 27, but is closed by a sealing plate 92. The latter therefore represents a sealing device which seals the third cooling fluid connection zone 25 of the machine housing 7, so that no fluid can be exchanged between the machine module 2 and the cooler module 90 through the third cooling fluid connection zone 25.

A closed cooling air circuit from one end for primary cooling air has the following profile in the cooler module 90:

The cooling air profile in the machine housing 7 in the embodiment of the electrical appliance 1 as shown in FIG. 5 corresponds to that in the embodiment shown in FIG. 4, as indicated by the flow direction arrows 85, 86 and 87.

Heated cooling air then enters the edge section 43 on the left in FIG. 5, of the cooler housing 91 via the first cooling fluid connection zone 20 and the aperture opening 22. Heat is initially exchanged between the heated primary cooling air and the secondary cooling air in the edge section 43, which secondary cooling air flows through the cooling air tubes 51 of the air heat exchanger 52 of the cooler module 90. A flow direction arrow 93 indicates the heated cooling air entering the edge section 43.

The cooling air which has been cooled down then bypasses the supporting wall 48 as indicated by a flow direction arrow 94, flows through the second cooler housing section 45, as indicated by a flow direction arrow 95, and then bypasses the supporting wall 50 as indicated by a flow direction arrow 96, with the cooling air that has now been cooled down flowing into the edge section 44 on the right in FIG. 5. The cooling air that has been cooled down therefore then once again flows through the aperture opening 24 and the second cooling fluid connection zone 23 into the machine housing 7, thus closing the primary air circuit.

Figure 6:
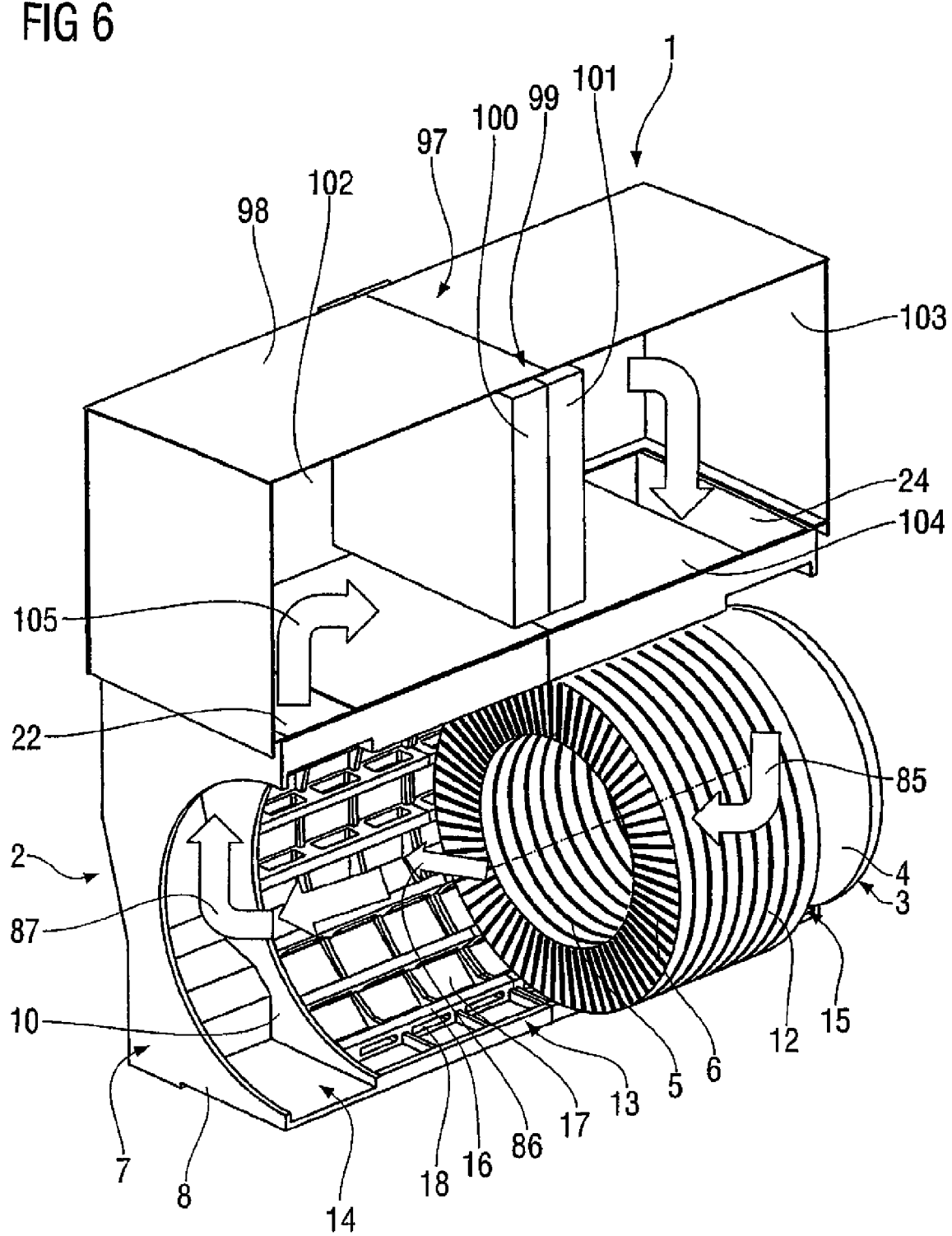

FIG. 6 shows a further variant of a cooler module 97 for mounting on the machine module 2. Components which correspond to those which have already been explained above with reference to FIGS. 1 to 5 have the same reference numbers and will not be discussed in detail again. An air-water heat exchanger 99 is arranged in a cooler housing 98 of the cooler module 97, centrally and parallel to the end wall of the cooler housing 91, as shown on the left and right in FIG. 6. The air-water heat exchanger 99 has two laminate modules 100, 101. Air flows through the laminates of the laminate modules 100, 101. This cooling air itself exchanges heat with the cooling water which is flowing through cooling water tubes which are accommodated in the laminate modules 100, 101. These modules have laminates through which cooling water flows corresponding to the laminates in the water heat exchanger 59 in the embodiment shown in FIG. 3. The main extent plane of the laminates of the water heat exchanger 99 in this case corresponds to that of the water heat exchanger 59. In principle, the embodiment of the water heat exchanger 59 shown in FIG. 3 can also be used instead of the water heat exchanger 99.

The water heat exchanger 99 subdivides the interior of the cooler housing 98 into a first cooler housing section 102, shown on the left in FIG. 6, and a second cooler housing section 103, shown on the right in FIG. 6. The first cooler housing section 102 is connected for fluid flow purposes via the aperture opening 22 to the first cooling fluid connection zone 20 of the machine housing 7. The second cooler housing section 103 is connected for fluid flow purposes via the aperture opening 24 to the second cooling fluid connection zone 22 of the machine housing 7. A fluid connection is provided between the two cooler housing sections 102, 103 via the water heat exchanger 99.

At the bottom, the cooler housing 91 of the cooler module 90 has a sealing plate 104 between the aperture openings 22 and 24. The latter represented a sealing device, which seals the third cooling fluid connection zone 25 of the machine housing 7, such that no fluid can be exchanged between the machine module 2 and the cooler module 97 through the third cooling fluid connection zone 25.

Air-water circuit cooling from one end is provided with the cooler module 97 for the electrical appliance 1 shown in FIG. 6 as follows:

The air flow in the machine housing 7 in the embodiment shown in FIG. 6 corresponds to that in the embodiment shown in FIGS. 4 and 5, as indicated by the flow direction arrows 85, 86 and 87. The heated cooling air enters the first cooler housing section 102 from the first edge section 14 via the first cooling fluid connection zone 20 and the aperture opening 22, as indicated by a flow direction arrow 105. From the first cooler housing section 102, the cooling air passes through the water heat exchanger 99, during which process it is cooled down by exchanging heat with the cooling air and the water, which is flowing through the laminate modules 100, 101. The cooling air that has been cooled down then flows from the second cooler housing section 103 through the aperture opening 24 and the second cooling fluid connection zone 23 into the second edge section 15 of the machine housing 7. This completes the cooling circuit for the primary cooling air.

The various variants of cooler modules 19, 41, 58, 72, 90, 97 represent a set, in which case, optionally a cooler module 19, 41, 58, 72, 90, 97 forming this set can be mounted on the machine module 2, whose design on the housing side is always the same, depending on the cooling requirements and the existing circumstances.

Wherever an aperture opening for connection to the outside is provided for the primary cooling air guides as described above, this can be designed such that it is protected against the ingress of water and dust.

As an alternative to or in addition to the aperture openings 18 in the webs 16, a tangential flow of cooling fluid between the stator casing 12 and the housing wall 17 can be achieved by the webs 16 being shaped such that the stator casing 12 rests on it only in places, so that intermediate spaces are created between the stator casing 12 and the webs 16, allowing a tangential flow through them.

What is claimed is:

1. A set, comprising:
a machine module including an electrical machine, and a machine housing having a housing wall constructed to form first and second cooling fluid connection zones in fluid communication with an interior of the machine housing, said machine housing accommodating the electrical machine such that an axial flow of cooling fluid is established between a stator casing and the housing wall;
a plurality of different cooler modules for selective attachment to the machine module, each of the cooler modules having a cooler housing attachable to the machine module for fluid communication with the interior of the machine housing via the first and second cooling fluid connection zones, without any design change to the machine module, wherein the housing wall in an area facing the cooler housing has a third cooling fluid connection zone which is fluidly connectable to the interior of the cooler housing by at least one cooling fluid through opening,
wherein a first type of the plurality of cooler modules includes
a first cooler housing area which is fluidly connected via at least one inlet opening to a surrounding area, and has through openings for fluid communication with the first and second cooling fluid connection zones, and
a second cooler housing area which is separated in a fluid-tight manner from the first cooler housing area, and is fluidly connected via at least one through opening to the third cooling fluid connection zone, and which is fluidly connected via an outlet opening to the surrounding area,
wherein a second type of the plurality of cooler modules includes
a first cooler housing section which is fluidly connected via through openings to the first and second cooling fluid connection zones,
a second cooler housing section which is fluidly connected to the first cooler housing section and fluidly connected via at least one through opening to the third cooling fluid connection zone, and
a heat exchanger in thermal contact with the first and second cooler housing sections,
wherein a third type of the plurality of cooler modules includes
a first cooler housing area which is fluidly connected via at least one inlet opening to a surrounding area, and fluidly connected via at least one through opening to the first cooling fluid connection zone,
a second cooling housing area which is separated in a fluid-tight manner from the first cooling housing area and fluidly connected via at least one through opening to the second cooling fluid connection zone and which is fluidly connected via at least one outlet opening to the surrounding area, and a sealing device to seal the third cooling fluid connection zone in the absence of any exchange of cooling fluid between the machine module and the third type of cooler module, wherein a fourth type of the plurality of cooler modules includes a first cooler housing section which is fluidly connected via at least one through opening to the first cooling fluid connection zone, a second cooler housing section which is fluidly connected to the first cooler housing section and fluidly connected via at least one through opening to the second cooling fluid connection zone, a heat exchanger in thermal contact with the first and second cooler housing sections, and a sealing device to seal the third cooling fluid connection zone in the absence of any exchange of cooling fluid between the machine module and the fourth type of cooler module through the third cooling fluid connection zone.

2. The set of claim 1, wherein the cooler housing of the fourth type of cooler module is identical to the cooler housing of the second type of cooler module, apart from the presence of the sealing device of the fourth type of cooler module.

3. The set of claim 1, wherein the heat exchanger of the second type of cooler module or the fourth type of cooler module is a gas-gas heat exchanger.

4. The set of claim 1, wherein the heat exchanger of the second type of cooler module or the fourth type of cooler module is an air-air heat exchanger.

5. The set of claim 1, wherein the heat exchanger of the second type of cooler module or the fourth type of cooler module is a gas-liquid heat exchanger.

6. The set of claim 1, wherein the heat exchanger of the second type of cooler module or the fourth type of cooler module is an air-water heat exchanger.

7. The set of claim 1, further comprising an electrical appliance including the machine module, which comprises the electrical machine with a stator and a rotor interacting with the stator, and the machine housing to receive the electrical machine, and a selected one of the plurality of cooler modules.

8. The set of claim 1, wherein the machine housing receives the electrical machine in such a manner that cooling fluid flows about the stator casing between the stator casing and the housing wall.

9. The set of claim 1, wherein the electric machine has a stator defined by an axis, said housing wall having webs which extend interiorly in parallel relationship to an to the stator axis and provided for abutment by the stator casing, at least in predetermined sections, wherein the webs clear through openings for circulating cooling fluid flow when the stator is installed.

10. The set of claim 9, wherein the through openings are formed in the webs.

11. The set of claim 1, wherein the cooling fluid is air.

12. The set of claim 1, further comprising at least one axial or radial fan for accommodation in the cooler housing and/or in the machine housing to establish an air flow direction.

* * * * *